US007003164B2

(12) United States Patent
Takebe

(10) Patent No.: US 7,003,164 B2
(45) Date of Patent: Feb. 21, 2006

(54) PATTERN RECOGNITION APPARATUS AND METHOD USING PROBABILITY DENSITY FUNCTION

(75) Inventor: Hiroaki Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 731 days.

(21) Appl. No.: 09/928,361

(22) Filed: Aug. 14, 2001

(65) Prior Publication Data

US 2002/0131644 A1 Sep. 19, 2002

(30) Foreign Application Priority Data

Jan. 31, 2001 (JP) ............................. 2001-022666

(51) Int. Cl.
*G06K 9/62* (2006.01)
(52) U.S. Cl. .................................................... 382/228
(58) Field of Classification Search ................ 382/187, 382/190, 195, 209, 217, 218, 224, 225, 228, 382/170, 299; 715/542

See application file for complete search history.

(56) References Cited

U.S. PATENT DOCUMENTS 5,794,178 A * 8/1998 Caid et al. ...................... 704/9
6,819,782 B1 * 11/2004 Imagawa et al. ........... 382/115

FOREIGN PATENT DOCUMENTS

| JP | 10-228543 | 8/1998 |
|---|---|---|
| JP | A-10-228543 | 8/1998 |
| JP | 11-039432 | 2/1999 |

OTHER PUBLICATIONS

Lawrence et al., "Face Recognition Using Mixture-Distance and Raw Images", Oct. 1997, IEEE International Conference on Simulation, vol. 3, pp. 2016-2021.*
Muller et al., "The Use of Eigenpictures for Optical Character Recognition", Proceedings, Fourteenth International Conference on Pattern Recognition, vol. 2, pp. 1124-1126.*
Peter Yianilos, "Metric Learning via Normal Mixtures", NEC Research Institute, 1995, 20 pages.*
Chinese Patent Office Action dated Dec. 3, 2004.
Shinji Tsuruoka, et al., "Handwritten Kanji and "Hiragana" Character Recognition Using Weighted Direction Index Histogram Method", IEICE Transactions vol. J70-D, No. 7.

* cited by examiner

*Primary Examiner*—Vikkram Bali
(74) *Attorney, Agent, or Firm*—Staas & Halsey LLP

(57) ABSTRACT

A set of difference vectors is generated by calculating the difference between the feature vector of each pattern in a specific pattern set and the average feature vector of each correct category. When a feature vector of an unknown pattern is inputted, the expected value of the probability density function of a specific category is obtained using an error distribution corresponding to the difference vector set as the probability density function. Then, the discriminant function value for the category is defined based on the obtained expected value and the pattern can be recognized.

10 Claims, 7 Drawing Sheets

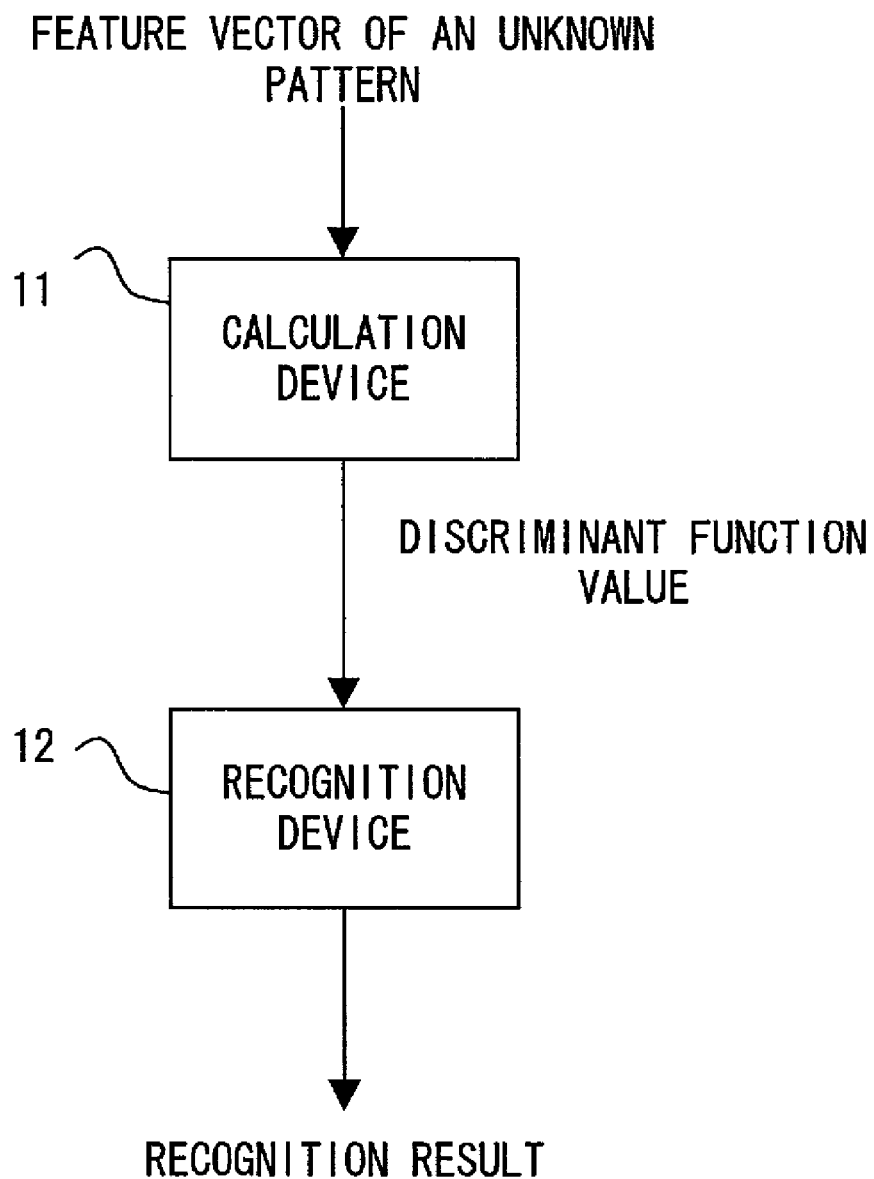
F I G. 1

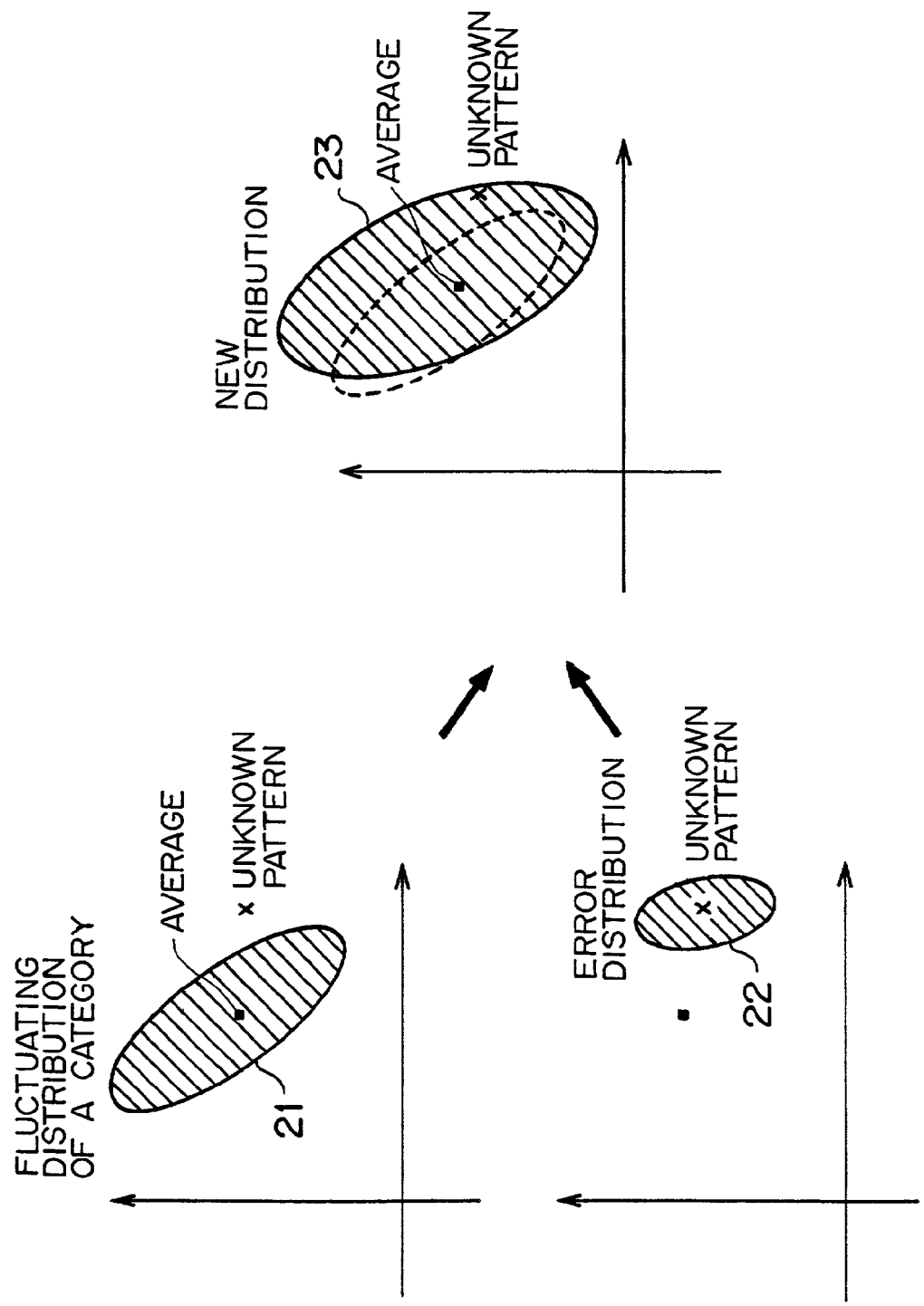
F I G. 3

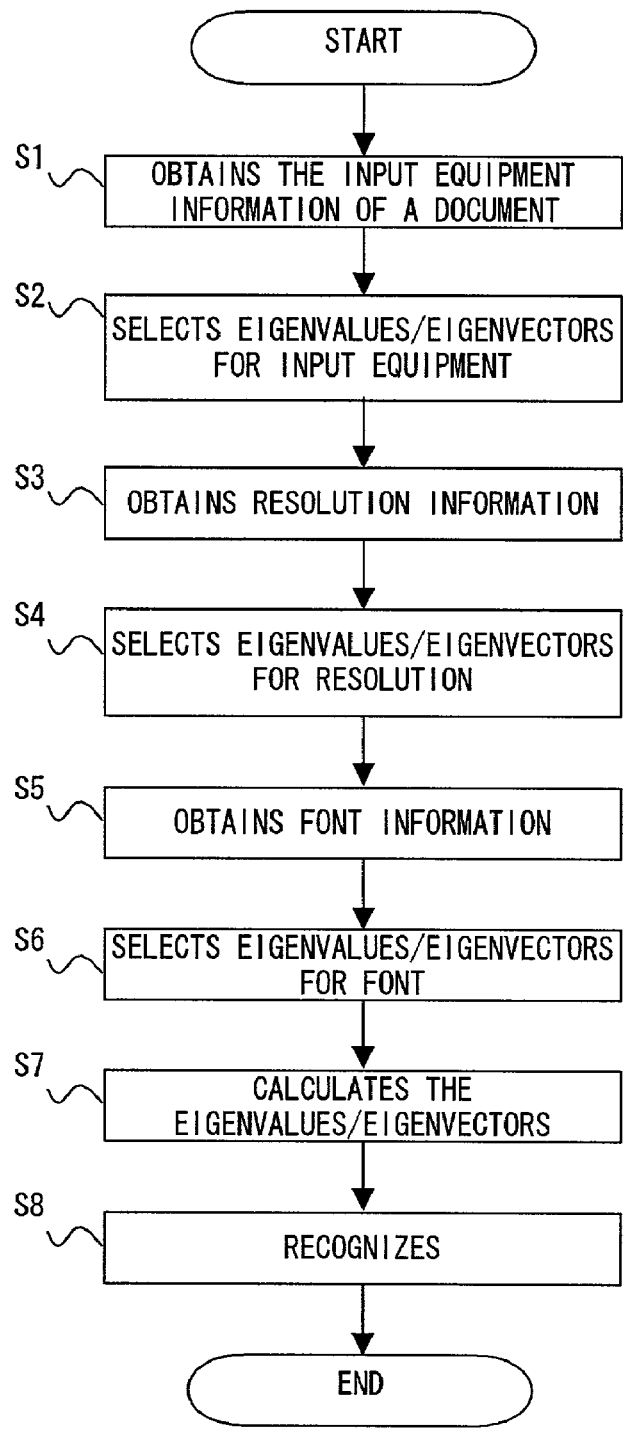
F I G. 4

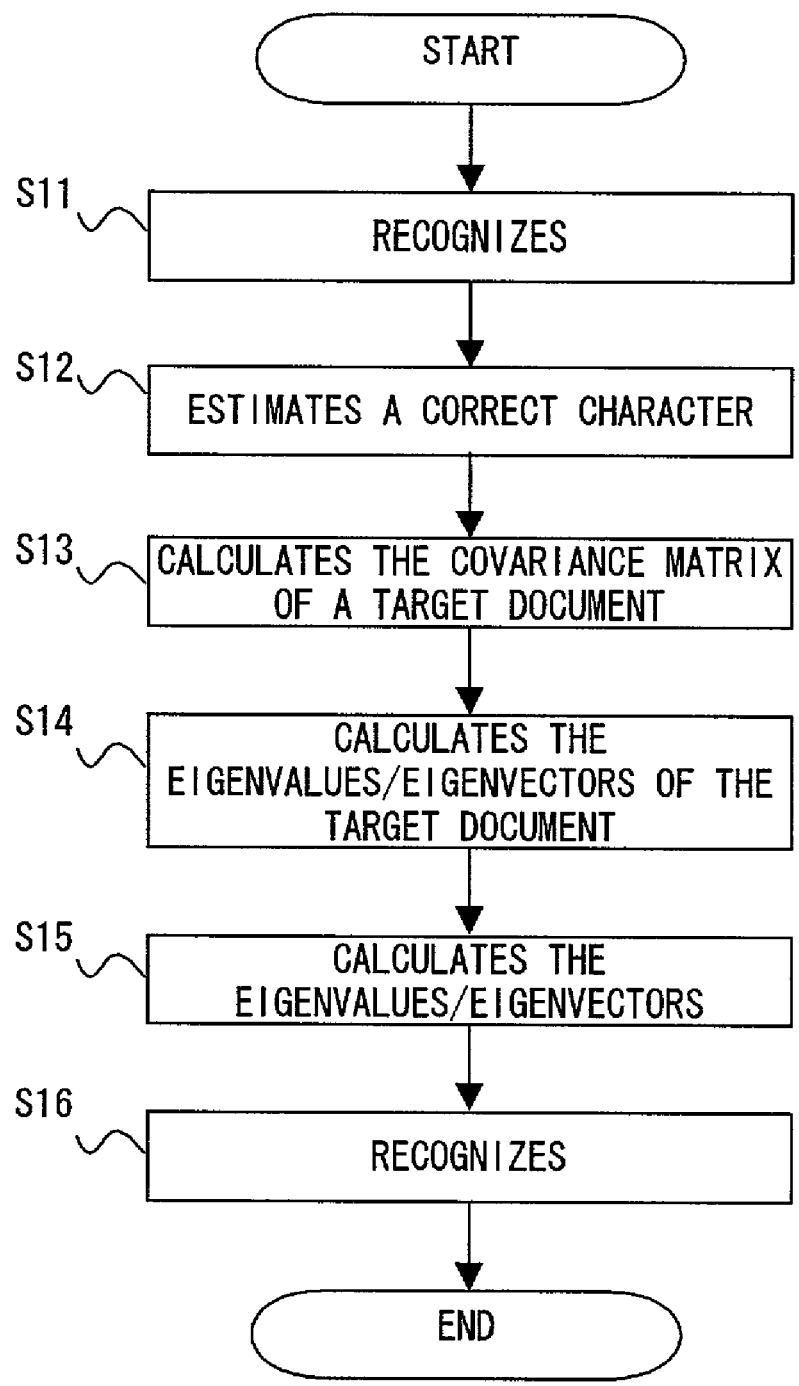
F I G. 5

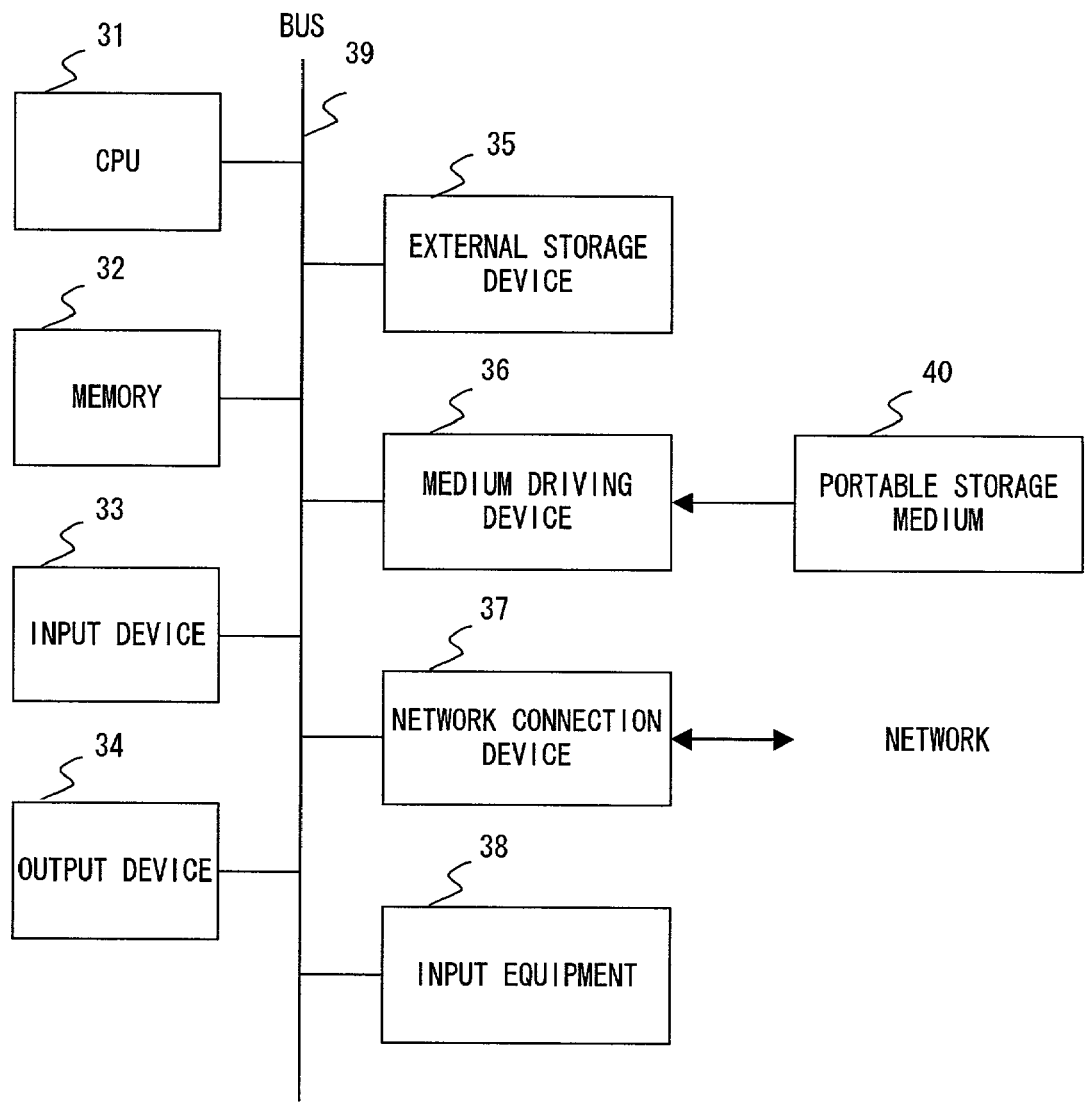
F I G. 6

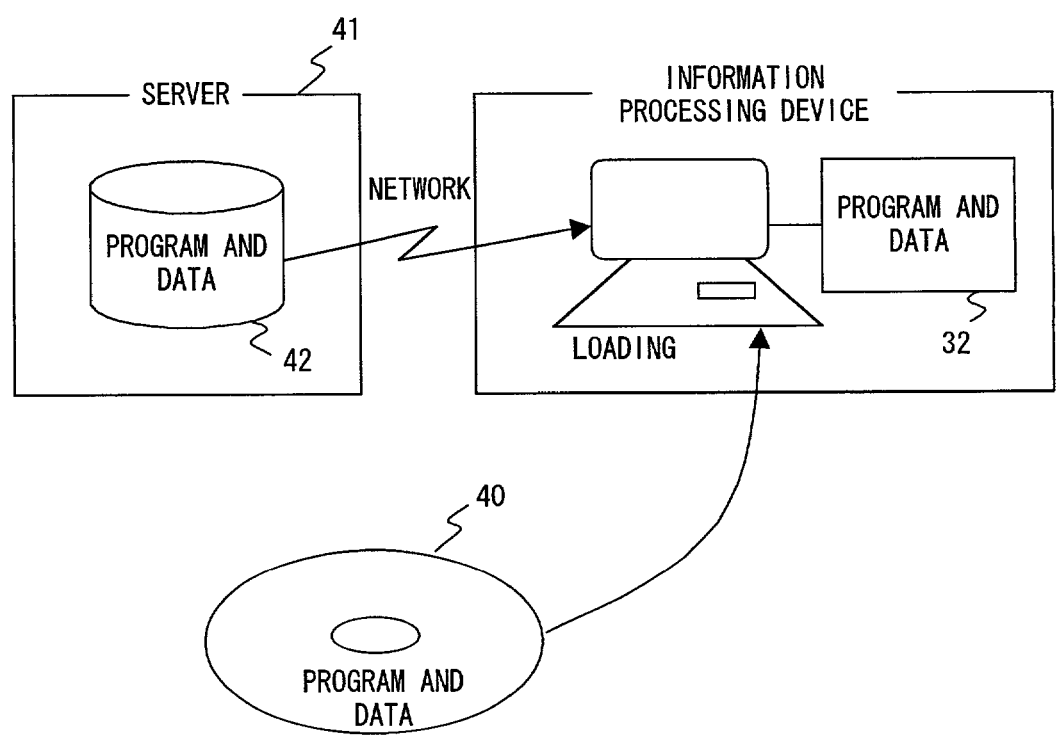
F I G. 7

PATTERN RECOGNITION APPARATUS AND METHOD USING PROBABILITY DENSITY FUNCTION

BACKGROUND OF THE INVENTION

1. Field of the Invention

The present invention relates to an apparatus for recognizing the patterns of characters and the like included in information of a recognition target and a method thereof.

2. Description of the Related Art

A conventional typical character recognition method is as follows. First, a feature is extracted from an inputted character pattern as a set of numeric values, that is, a vector by a specific predetermined method. In other words, an input pattern is mapped to a point in a feature vector space by feature extraction. Then, the distance between the feature vector of this input pattern and the representative point of each category in the vector space is calculated and the closest category is designated as a recognition result.

The representative point of each category in the vector space is the average in the vector space of sample pattern feature vectors prepared for each category. For the distance scale, a city block distance, a Euclid distance and the like are used.

"Hand-written Kanji/Hiragana Recognition by a Weighted Directional Index Histogram Method" by Tsuruoka et al. (Paper Journal D of The Institute of Electronics, Information and Communication Engineers, Vol. J70-D, No. 7, pp.1390–1397, July 1987) proposes a method using modified Bayes discriminant function that reflects the distribution in a feature vector space of each category, instead of a simple distance.

This method is obtained by modifying Bayes discriminant function, which is an optimal discriminant function when sample patterns are based on a normal distribution and both an average and a covariance matrix are already known, so as to solve theoretical and implementation problems. In this case, the problems are that the higher an order of an eigenvector of the covariance matrix, the bigger an estimation error, that a huge calculation amount and a huge memory capacity are needed, and the like. If the (n-dimensional) feature vector of an input pattern is assumed to be x, a Bayes discriminant function $f_c(x)$ for a category C and a modified Bayes discriminant function $g_c(x)$ are defined as follows.

(1) Bayes Discriminant Function $$f_c(x) = (x - m_c)^t \sum_c^{-1} (x - m_c) + \log\left|\sum_c\right| \quad (1)$$

$m_c$: Average vector of category C
$\Sigma_c$: Covariance matrix of category C (2) Modified Bayes Discriminant Function $$g_c(x) = \frac{1}{\alpha_c^{k+1}}\left\{\|x - m_c\|^2 - \sum_{i=1}^{k}\left(1 - \frac{\alpha_c^{k+1}}{\alpha_c^i}\right)((x - m_c) \cdot v_c^i)^2\right\} + \quad (2)$$

-continued $$\log\left(\prod_{i=1}^{k}\alpha_c^i \cdot \prod_{i=k+1}^{n}\alpha_c^{k+1}\right)$$

$\alpha_c^i$: i-th eigenvalue of $\Sigma_c$
$v_c^i$: Eigenvector corresponding to the i-th eigenvalue of $\Sigma_c$
k: Integer between 1 and n, including 1 and n However, the conventional pattern recognition described above has the following problems.

Even if a modified Bayes discriminant function is used, the recognition accuracy of fonts greatly deformed compared with a Mincho style, which is the most popular font for Japanese, and characters in a document greatly degraded depending on an input/output condition is not good. If greatly deformed fonts are degraded, the recognition accuracy further decreases.

SUMMARY OF THE INVENTION

It is an object of the present invention to provide a pattern recognition apparatus for performing a high-accuracy recognition process for a pattern with a specific feature, such as greatly deformed fonts and characters in a greatly degraded document.

The pattern recognition apparatus of the present invention comprises a calculation device and a recognition device, and performs recognition based on a probability density function that is defined for each category in the feature vector space of a pattern.

When a set of difference vectors is generated by calculating a difference between a feature vector of each pattern in a specific pattern set and an average feature vector of each correct category, an expected value of a probability density function of a specific category is defined using a normal distribution with an autocorrelation matrix of the set of difference vectors and a feature vector of an unknown pattern as a covariance matrix and an average, respectively, as a probability density function and a discriminant function of the specific category is defined based on the expected value, the calculation device calculates a value of the discriminant function for the feature vector of the known pattern.

The recognition device recognizes the unknown pattern based on the value of the discriminant function and outputs a recognition result.

BRIEF DESCRIPTION OF THE DRAWINGS

FIG. 1 shows the basic configuration of a pattern recognition apparatus of the present invention;

FIG. 3 shows the changing a distribution of a category;

FIG. 4 is a flowchart showing the first character recognition process;

FIG. 5 is a flowchart showing the second character recognition process;

FIG. 6 shows the configuration of an information processing device.

FIG. 7 shows storage media.

DESCRIPTION OF THE PREFERRED EMBODIMENT

Figure 2:
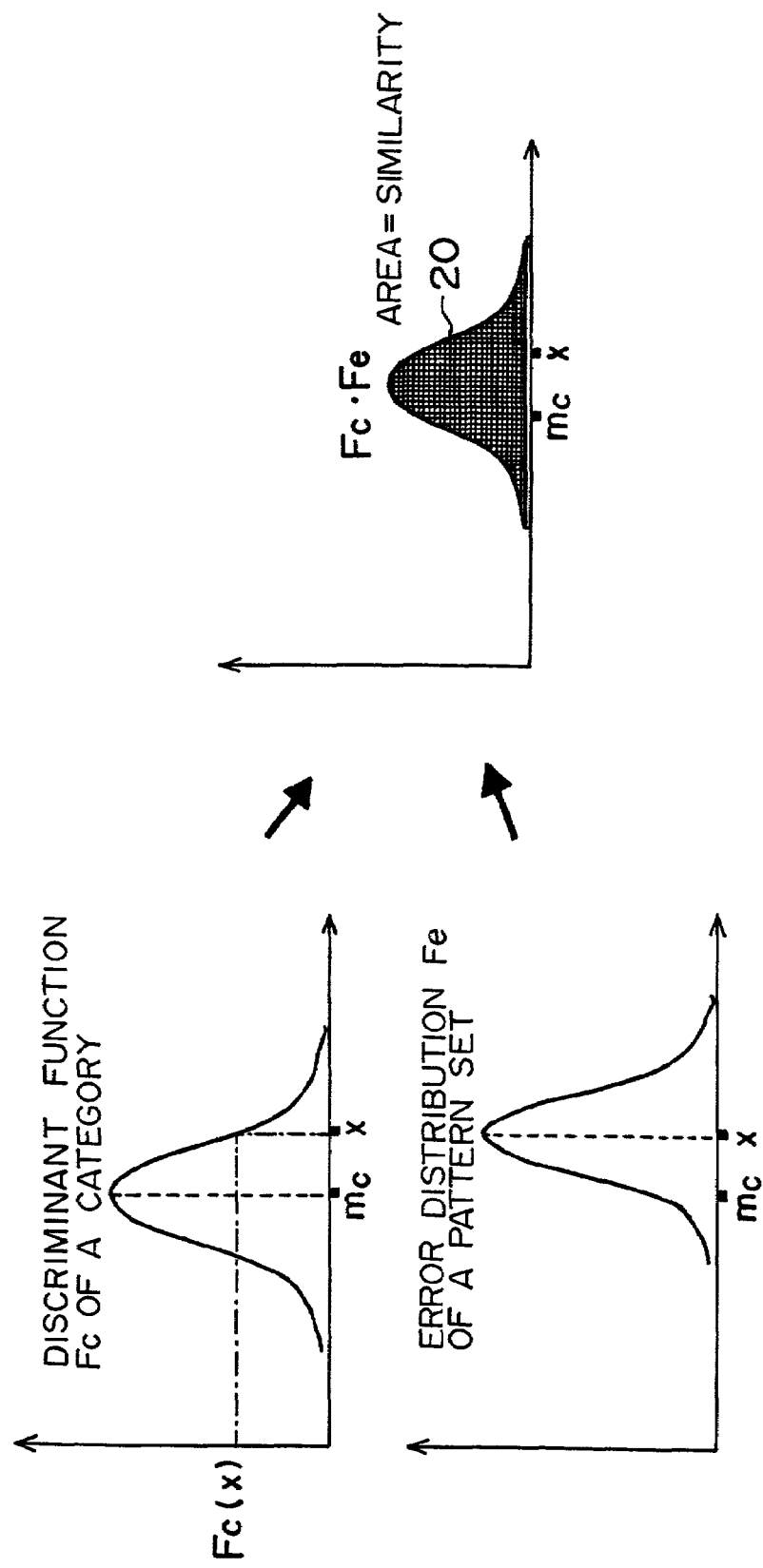
FIG. 2 shows the generation of a discriminant function value.

The preferred embodiment of the present invention is described in detail below with reference to the drawings.

FIG. 1 shows the basic configuration of a pattern recognition apparatus of the present invention. The pattern recognition apparatus shown in FIG. 1 comprises a calculation device and a recognition device, and performs recognition based on a probability density function that is defined for each category in the feature vector space of a pattern.

When a set of difference vectors is generated by calculating a difference between a feature vector of each pattern in a specific pattern set and an average feature vector of each correct category, an expected value of a probability density function of a specific category is defined using a normal distribution with an autocorrelation matrix of the set of difference vectors and a feature vector of an unknown pattern as a covariance matrix and an average, respectively, as a probability density function and a discriminant function of the specific category is defined based on the expected value, the calculation device 11 calculates a value of the discriminant function for the feature vector of the known pattern.

The recognition device 12 recognizes the unknown pattern based on the value of the discriminant function and outputs a recognition result.

A set of difference vectors is considered to express an error distribution peculiar to a pattern set, and its autocorrelation matrix includes information about the error distribution. An expected value that reflects the information of the error distribution is generated by using a normal distribution with this autocorrelation matrix as the covariance matrix, as a probability density function. Therefore, a discriminant function that is defined based on this expected value reflects a feature peculiar to the pattern set.

The calculation device 11 calculates the value of this discriminant function of the feature vector of the unknown pattern and outputs the calculation result to the recognition device 12. The recognition device 12 judges the category of the unknown pattern, based on the received discriminant function value, and outputs the judgment result.

According to such a pattern recognition apparatus, an unknown pattern with the same feature as the pattern set can be recognized with higher accuracy. For example, if a difference vector set is generated from a set of character patterns of a greatly deformed font, the recognition accuracy of an unknown pattern of the font can be improved. If a difference vector set is generated from a set of character patterns in a greatly degraded document, the recognition accuracy of an unknown pattern with a similar degradation can be improved.

The calculation device 11 and recognition device 12 shown in FIG. 1 correspond, for example, to the combination of the CPU (central processing unit) 31 and memory 32 shown in FIG. 6, which are described later.

This preferred embodiment adopts a method for adding information peculiar to a font or deformation due to degradation to the conventional modified Bayes discriminant function. First, if a set of specific input patterns is inputted, the difference between the feature vector of each pattern of the pattern set and the average feature vector of a corresponding correct category is calculated and a set of the obtained difference vectors is regarded as an error distribution peculiar to the pattern set.

Then, if the feature vector x of an unknown pattern is inputted, with respect to a point x in a feature vector space shown in FIG. 2, the error distribution peculiar to the pattern set is designated as a probability density function $F_e(x)$. Then, a probability density function of the discriminant function of a category C is designated as $F_c(x)$, the expected value (similarity) of function $F_c(x)$ is calculated using $F_e(x)$, and the discriminant function value of category C is defined based on the obtained expected value. In this case, the expected value of function $F_c(x)$ corresponds to the area of the region 20 shown in FIG. 2 and is calculated according to the following equation.

$$\text{Expected value of } F_c(x) = \int F_c(x) \cdot F_e(x) dx \qquad (3)$$

FIG. 3 shows the changing distribution of a category in the case where such a discriminant function value is used. A new distribution 23 is generated from both is used. A new distribution 23 is generated from both the distribution 21 of feature vectors of category C based on the original discriminant function and the error distribution 22 peculiar to a specific pattern set.

Even if at this moment, the original distribution 21 does not include the feature vector of the unknown pattern, the new distribution 23 includes the feature vector and category C can be adopted as the recognition result of the unknown pattern. Therefore, if the unknown pattern has the same feature as the pattern set corresponding to the error distribution 22, the recognition accuracy of the unknown pattern can be improved.

Next, how to calculate a new discriminant function is described in detail. First, a function $q(m_1, m_2, \Sigma_1, \Sigma_2)$ that is obtained by summing a normal distribution of an average $m_1$ and a covariance matrix $\Sigma_1$ weighting it with a normal distribution of an average $m_2$ and a covariance matrix $\Sigma_2$, is calculated according to the following equation.

$$q\left(m_1, m_2, \sum_1, \sum_2\right) = \int_{R^d} \frac{1}{(2\pi)^{\frac{d}{2}} |\sum_1|^{\frac{1}{2}}} \exp\left\{-\frac{1}{2}(x-m_1)^t \sum_1^{-1} (x-m_1)\right\} \cdot \frac{1}{(2\pi)^{\frac{d}{2}} |\sum_2|^{\frac{1}{2}}} \exp\left\{-\frac{1}{2}(x-m_2)^t \sum_2^{-1} (x-m_2)\right\} dx \qquad (4)$$

$$= \frac{1}{(2\pi)^{\frac{d}{2}}|\Sigma_1|^{\frac{1}{2}}|\Sigma_2|^{\frac{1}{2}}\left|\Sigma_1^{-1}+\Sigma_2^{-1}\right|^{\frac{1}{2}}} \exp\left(-\frac{1}{2}K\right)$$

However, in the above equation, $$K = m_1^t \Sigma_1^{-1} m_1 + m_2^t \Sigma_2^{-1} m_2 - (\Sigma_1^{-1} m_1 + \Sigma_2^{-1} m_2)^t \\ (\Sigma_1^{-1}+\Sigma_2^{-1})^{-1}(\Sigma_1^{-1} m_1 + \Sigma_2^{-1} m_2) \quad (5)$$

A new discriminant function $\phi_c(x)$ can be defined as follows using this $q(m_1, m_2, \Sigma_1, \Sigma_2)$.

$$\phi_c(x) = -2\log q(m_c, x, \Sigma_c, \Sigma) \quad (6)$$

x: (n-dimensional) feature vector of an input pattern
$m_c$: Average vector of category C
$\Sigma_c$: Covariance matrix of category C
$\Sigma$: Covariance matrix of the error distribution of a pattern set
$q(m_c, x, \Sigma_c, \Sigma)$ corresponds to the expected value of equation (3). By removing constant terms from this $\phi_c(x)$, the following discriminant function $\Phi_c(x)$ is obtained.

$$\Phi_c(x) = m_c^t \sum_c^{-1} m_c - \left(\sum_c^{-1} x + \sum_c^{-1} m_c\right)^t \left(\sum^{-1} + \sum_c^{-1}\right)^{-1} \left(\sum^{-1} x + \sum_c^{-1} m_c\right) + \\ \log\left|\sum_c\right| + \log\left|\sum^{-1} + \sum_c^{-1}\right| \\ = (x - m_c)^t \left(\sum + \sum_c\right)^{-1} (x - m_c) + \log\left|\sum + \sum_c\right| \quad (7)$$

This $\Phi_c(x)$ equals a discriminant function obtained by replacing $\Sigma_c$ with $\Sigma+\Sigma_c$ in the modified Bayes discriminant function $F_c(x)$ of equation (1). In the same way as the shift from a Bayes discriminant function to a modified Bayes discriminant function, the following new discriminant function $\psi_c(x)$ is defined.

$$\Psi_c(x) = \frac{1}{\gamma_c^{l+1}} \left\{ \|x - m_c\|^2 - \sum_{i=1}^{l}\left(1 - \frac{\gamma_c^{l+1}}{\gamma_c^i}\right)((x - m_c) \cdot z_c^i)^2 \right\} + \\ \log\left(\prod_{i=1}^{l} \gamma_c^i \cdot \prod_{i=l+1}^{n} \gamma_c^{l+1}\right) \quad (8)$$

$\gamma_c^i$: i-th eigenvalue of $\Sigma+\Sigma_c$
$z_c^i$: Eigenvector corresponding to the i-th eigenvalue of $\Sigma+\Sigma_c$
l: Integer between 1 and n, including 1 and n In this case, both $\gamma_c^i$ and $z_c^i$ should be calculated. However, the calculation of all eigenvalues and eigenvectors for each category takes enormous time. Therefore, of the respective eigenvalues and eigenvectors of $\Sigma+\Sigma_c$, those in the higher ranks are calculated in descending order of eigenvalues, and the approximate values of both the eigenvalues and eigenvectors of $\Sigma+\Sigma_c$ are calculated at high speed using those eigenvalues and eigenvectors.

In the following description, the affix C of a category is omitted for conveniences' sake, and $\gamma_c^i$ and $z_c^i$ are described as $\gamma_i$ and $z_i$, respectively. Then, both $\gamma_i$ and an n-dimensional vector $z_i$ (i=1, 2, . . . , l) can be calculated as follows.

<Calculation Algorithm of Eigenvalues/Eigenvectors>

First, it is assumed that the higher-rank s eigenvalues of a covariance matrix $\Sigma_c$ and eigenvectors corresponding to the eigenvalues are $\alpha_1 \geq \alpha_2 \geq \ldots \geq \alpha_s$ (s≦l) and $v_1, v_2, \ldots, v_s$, respectively. It is also assumed that the higher-rank t eigenvalues of a covariance matrix $\Sigma$ and eigenvectors corresponding to the eigenvalues are $\beta_1 \geq \beta_2 \geq \ldots \geq \beta_t$ (t≦l, l≦s+t) and $w_1, w_2, \ldots, w_t$, respectively. Then, as shown below, it is assumed that a vector subspace covered by $v_1, v_2, \ldots, v_s$ and a vector subspace covered by $w_1, w_2, \ldots, w_t$ are V and W, respectively, and that a space obtained by summing V and W is U.

$$V = \{v_1, v_2, \ldots, v_s\} \quad (9)$$

$$W = \{w_1, w_2, \ldots, w_t\} \quad (10)$$

$$U = V + W \quad (11)$$

Then, both n-dimensional vectors $w'_1, w'_2, \ldots, w'_u$ (s+u=l) and $v'_1, v'_2, \ldots, v'_v$ (t+v=l) that satisfy the following equation are calculated by Gram-Schmidt orthogonalization.

$$U = \{v_1, v_2, \ldots, v_s, w'_1, w'_2, \ldots, w'_u\} = \{v'_1, v'_2 \ldots, v'_v, w_1, w_2, \ldots, w_t\} \quad (12)$$

Then, matrices $V_w$, $W_v$, A and B are defined as follows.

$$V_w = (v_1 v_2 \ldots v_s w'_1 w'_2 \ldots w'_u) \quad (13)$$

$$W_v = (w_1 w_2 \ldots w_t v'_1 v'_2 \ldots v'_v) \quad (14)$$

$$A = \begin{pmatrix} \alpha_1 & & & & & & \\ & \alpha_2 & & & & & \\ & & \ddots & & & & \\ & & & \alpha_s & & & \\ & & & & \alpha & & \\ & & & & & \alpha & \\ & & & & & & \ddots \\ & & & & & & & \alpha \end{pmatrix} \quad (15)$$

$$B = \begin{pmatrix} \beta_1 & & & & & & \\ & \beta_2 & & & & & \\ & & \ddots & & & & \\ & & & \beta_t & & & \\ & & & & \beta & & \\ & & & & & \beta & \\ & & & & & & \ddots \\ & & & & & & & \beta \end{pmatrix} \quad (16)$$

However, it is assumed that $\alpha$ ($=\alpha_{s+1}$) and $\beta$ ($=\beta_{t+1}$) are already known. In this case, if a specific orthogonal matrix P is used, $W_v = V_w P$. Therefore, a matrix $A + PBP^t$ is worked out in order to calculate the eigenvalues of $\Sigma+\Sigma_c$ in U, this matrix is diagonalized as shown below, and the obtained diagonal components are assumed to be $\gamma_1, \gamma_2, \ldots, \gamma_{s+u}$ ($\gamma_{s+u} = \gamma_1$).

$$A + PBP^t = X\Gamma X^t \quad (17)$$

$$X = (x_1 \ x_2 \ \ldots \ x_{s+u}) \qquad (18)$$

$$\Gamma = \begin{pmatrix} \gamma_1 & & & \\ & \gamma_2 & & \\ & & \ddots & \\ & & & \gamma_{s+u} \end{pmatrix} \qquad (19)$$

Then, $z_1, z_2, \ldots, z_{s+u}$ ($z_{s+u} = z_l$) are calculated according to the following equation.

$$(z_1 \ z_2 \ \ldots \ z_{s+u}) = V_u X \qquad (20)$$

Next, a specific example of a pattern recognition process using the discriminant function of equation (8) is described with reference to FIGS. 4 and 5.

For example, if characters in a document image that are inputted by input equipment are recognized, the following three character pattern sets are prepared assuming that the font type of an input document, the type of the input equipment and the resolution of the document image are F, I and R, respectively.

$S_F$: Set of the character patterns of font F $S_I$: Set of character patterns inputted by input equipment I $S_R$: Set of character patterns inputted with resolution R Then, the difference between each feature vector and the average feature vector of the category of each correct character (correct category) is calculated for each character pattern set, and the respective sets of each character pattern set, and the respective sets of obtained difference vectors for the three character pattern sets are assumed to be $D_{SF}$, $D_{SI}$, and $D_{SR}$.

In this case, when a character of an unknown pattern of font F is recognized, the expected value of the probability density function of category C is calculated using a normal distribution with the feature vector x of the unknown pattern and the autocorrelation matrix of difference vector set $D_{SF}$ as an average and a covariance matrix, respectively, as the probability density function. Then, the discriminant function of equation (8) is calculated based on the expected value, the value of the discriminant function for the feature vector of the unknown pattern is calculated, and character recognition is performed.

When a character of an unknown pattern that is inputted by input equipment I is recognized, the expected value of the probability density function of category C is calculated using a normal distribution with the feature vector x of the unknown pattern and the autocorrelation matrix of difference vector set $D_{SI}$ as an average and a covariance matrix, respectively, as the probability density function.

When a character of an unknown pattern that is inputted with resolution R is recognized, the expected value of the probability density function of category C is calculated using a normal distribution with the feature vector x of the unknown pattern and the autocorrelation matrix of difference vector set $D_{SR}$ as an average and a covariance matrix, respectively, as the probability density function.

When the combination of these three difference vector sets is used, first, at each point x in a feature vector space, the expected value $f_1(x)$ of the probability density function $f_0(x)$ of category C is calculated using a normal distribution with the autocorrelation matrix of set $D_{SF}$ as the covariance matrix, as the probability density function.

Then, at each point x, the expected value $f_2(x)$ of function $f_1(x)$ is calculated using a normal distribution with the autocorrelation matrix of set $D_{SI}$ as the covariance matrix, as the probability density function. Furthermore, at each point x, the expected value $f_3(x)$ of function $f_2(x)$ is calculated using a normal distribution with the autocorrelation matrix of set $D_{SR}$ as the covariance matrix, as the probability density function and this expected value $f_3(x)$ is designated as the new probability density function of category C.

In this case, a corresponding discriminant function $\psi_c(x)$ can be obtained by replacing the $q(m_c, x, \Sigma_c, \Sigma)$ of equation (6) with the expected value $f_3(x)$.

Although in this example, three character pattern sets $S_F$, $S_I$ and $S_R$ are used, generally one or more arbitrary character pattern sets can be used and their error distributions can be reflected on the discriminant function. In the calculation of an expected value, it is not always necessary to use error distribution information in the order of sets $D_{SF}$, $D_{SI}$ and $D_{SR}$, and these can be used in an arbitrary order.

FIG. 4 is a flowchart showing a character recognition process using such three character pattern sets. The pattern recognition apparatus first obtains information about equipment used to input a document to be recognized (step S1). For the equipment, a scanner, a digital camera, a facsimile device and the like are used. The pattern recognition apparatus obtains this information, for example, by automatically judging the type of equipment analyzing an image or by making a user input the type of equipment.

Then, the pattern recognition apparatus obtains information about an error distribution corresponding to input equipment from error distribution information that is stored in advance, based on the obtained information (step S2). Specifically, the higher-rank $m_1$ eigenvalues/eigenvectors of a covariance matrix corresponding to set $D_{SI}$ are extracted as error distribution information.

Then, the pattern recognition apparatus obtains information about the image resolution of the document to be recognized (step S3). For the resolution, for example, 157 dots/cm, 118 dots/cm, 79 dots/cm and the like are used. The pattern recognition apparatus obtains this information, for example, by automatically judging the resolution analyzing an image or by making a user input the resolution.

Then, the pattern recognition apparatus obtains information about an error distribution corresponding to resolution from error distribution information that is stored in advance, based on the obtained information (step S4). Specifically, the higher-rank $m_2$ eigenvalues/eigenvectors of a covariance matrix corresponding to set $D_{SR}$ are extracted.

Then, the pattern recognition apparatus obtains information about the font type of the document to be recognized (step S5). For the font, for example, thin mincho, intermediate mincho, bold mincho, thin Gothic, intermediate Gothic, bold Gothic, block style and the like are used. The pattern recognition apparatus obtains this information, for example, by automatically judging the type of a font analyzing an image or by making a user input the type of a font.

Then, the pattern recognition apparatus obtains information about an error distribution corresponding to a font type from an error distribution that is stored in advance, based on the obtained information (step S6). Specifically, the higher-rank $m_3$ eigenvalues/eigenvectors of a covariance matrix corresponding to set $D_{SF}$ are extracted.

Then, the pattern recognition apparatus calculates the new eigenvalues/eigenvectors of each category by applying the calculation algorithm for a eigenvalues/eigenvectors described above to both the the higher-rank $m_0$ eigenvalues/eigenvectors of a covariance matrix of the fluctuating distribution of each category and the eigenvalues/eigenvectors that are obtained in steps S2, S4 and S6 (step S7).

Then, the pattern recognition apparatus calculates the discriminant function value of equation (8) using the obtained eigenvalues/eigenvectors and performs the modified Bayes discrimination (step S8). Then, the pattern recognition apparatus outputs the recognition result obtained by the discrimination.

Although in the character recognition process shown in FIG. 4, an error distribution is generated using a character pattern set prepared in advance, the character pattern set can also be dynamically generated based on the inputted document to be recognized.

In this case, the pattern recognition apparatus calculates the respective probability density function values of all categories for each character pattern in set $S_D$ of character patterns included in a specific input document D, and extracts the character patterns, for which the maximum value of the probability density function values is larger than a specific threshold value, as a character pattern with a correct character. Then, the pattern recognition apparatus calculates the difference between each feature vector and the average of each correct category for the extracted character pattern set and designates the obtained difference vector set as set $D_{SD}$.

Then, the pattern recognition apparatus calculates the expected value of the probability density function of category C for a specific character pattern of character pattern set $S_D$ using a normal distribution with the feature vector x and the autocorrelation matrix of set $D_{SD}$ as an average and a covariance matrix, as the probability density function and calculates the discriminant function value of category C for x, based on the obtained expected value.

FIG. 5 is a flowchart showing such a character recognition process. The pattern recognition apparatus first recognizes characters in the document to be recognized by an arbitrary method (step S11). In this character recognition, a city block distance or a Euclid distance can be used. Alternatively, a modified Bayes discriminant function can be used.

Then, the pattern recognition apparatus estimates the category of a correct character, based on the recognition result (step S12). In this estimation, a character, for which the recognition distance value is equal to or less than a specific threshold, can be regarded as a correct character. Alternatively, the recognition confidence degree can be calculated, and a character, for which the recognition confidence degree is equal to or more than a specific threshold, can be regarded as a correct character.

Then, the pattern recognition apparatus calculates the covariance matrix of the error distribution with respect to the estimated correct character (step S13), calculates the eigenvalues/eigenvectors of the covariance matrix and selects the higher-rank m eigenvalues/eigenvectors (step S14).

Then, the pattern recognition apparatus calculates the new eigenvalues/eigenvectors of each category by applying the calculation algorithm for eigenvalues/eigenvectors described above to both the higher-rank $m_0$ eigenvalues/eigenvectors of a covariance matrix with respect to the fluctuating distribution of each category and the eigenvalues/eigenvectors that are obtained in step S14 (step S15).

Then, the pattern recognition apparatus calculates the discriminant function value of equation (8) using the obtained eigenvalues/eigenvectors and performs the modified Bayes discrimination (step S16) Then, the pattern recognition apparatus outputs the recognition result obtained by the discrimination. In this case, the discriminant function values of all the character patterns can be calculated again. Alternatively, the discriminant function values of only characters that are estimated to be incorrect can be calculated again. An incorrect character corresponds to, for example, a character for which the distance value is larger than the threshold value or a character for which the confidence degree is smaller than the threshold value.

The pattern recognition apparatus shown in FIG. 1 can be configured, for example, using an information processing device (computer) shown in FIG. 6. The information processing device shown in FIG. 6 comprises a CPU (central processing unit) 31, a memory 32, an input device 33, an output device 34, an external storage device 35, a medium driving device 36, a network connection device 37 and input equipment 38, and the devices are connected to one another by a bus 39.

The memory 32 is, for example, a ROM, a RAM and the like, and stores a program and data to be used for the process. The CPU 31 performs necessary processes by using the memory 32 and running the program.

The input device 33 is, for example, a keyboard, a pointing device, a touch panel and the like, and is used for a user to input instructions and information. The output device 34 is, for example, a display device, a speaker, a printer and the like, and outputs inquiries and process results to a user.

The external storage device 35 is, for example, a magnetic disk device, an optical disk device, a magneto-optical disk device, a tape device and the like. The information processing device stores both the program and data in this external storage device 35, and uses the program and data by loading them into the memory, as requested. For example, the external storage device 35 stores in advance both the eigenvalues/eigenvectors of the covariance matrix with respect to the fluctuating distribution of each category and the eigenvalues/eigenvectors of the covariance matrix corresponding to a difference vector set as data.

The medium driving device 36 drives a portable storage medium 40 and accesses the recorded content. For the portable storage medium, an arbitrary computer-readable storage medium, such as a memory card, a floppy disk, a CD-ROM (compact-disk read-only-memory), an optical disk, a magneto-optical disk and the like are used. A user stores in advance the program and data in this portable storage medium and uses the program and data loading them into the memory 32, as requested.

The network connection device 37 is connected to an arbitrary communications network, such as a LAN (local area network), and transmits/receives data accompanying communications. The information processing device receives the program and data from another device, such as a server and the like, through the network connection device 37 and uses the program and data loading them into the memory 32.

The input equipment 38 is, for example, a scanner, a digital camera, a facsimile device and the like, and inputs information, such as an image to be recognized.

FIG. 7 shows computer-readable storage media for providing the information processing device shown in FIG. 6 with a program and data. The program and data stored in the portable storage medium 40 or the database 42 of a server 41 are loaded into the memory 32. In this case, the server 41 generates a propagation signal for propagating the program and data, and transmits the signal to the information processing device through an arbitrary transmitting medium in the network. Then, the CPU 31 performs necessary processes by running the program using the data.

Although in the preferred embodiment described above, mainly character recognition is described, the present invention is applicable to arbitrary pattern recognition in which a probability density function can be defined for each category in a feature vector space. For example, the present invention is also applicable to a process for recognizing a pattern, such as a ruled line included in a document image, and the shape, color and the like, of an object included in the image of a graphic/photograph. Furthermore, information as a recognition target is not limited only to images, but any information sequentially inputted in a time series, such as voice, can also be used.

According to the present invention, high-accuracy pattern recognition can be implemented for a recognition target, for which only extremely low recognition accuracy can be implemented according to the conventional method. For example, in the case of character recognition, the recognition accuracy of a greatly deformed font compared with the most popular mincho style, a character in a document greatly degraded by an input/output condition, or a degraded character of a greatly deformed font can be improved.

What is claimed is:

1. A pattern recognition apparatus for recognizing a pattern based on a value of a probability density function defined for each category in a feature vector space of a pattern, comprising:
    a calculation device calculating a value of a discriminant function of a specific category for a feature vector of an unknown pattern; and
    a recognition device recognizing the unknown pattern based on the value of the discriminant function and outputting a recognition result; and
    wherein said calculation device:
    calculating a set of difference vectors by calculating a difference between a feature vector of each pattern in a specific pattern set and an average feature vector of each correct category;
    calculating an expected value of a probability density function of a specific category using an error distribution corresponding to the set of difference vectors as the probability density function; and
    calculating the value of the discriminant function for the specific category based on the expected value.

2. The pattern recognition apparatus according to claim 1, further comprising
    a storage device storing both information about eigenvalues and eigenvecters of a covariance matrix of a fluctuating distribution of the category and information about eigenvalues and eigenvectors of a covariance matrix of the normal distribution,
    wherein said calculation device calculates the value of the discriminant function using the information stored in the storage device.

3. A pattern recognition apparatus for recognizing a character based on a value of a probability density function defined for each category in a feature vector space of a character pattern, comprising:
    a calculation device calculating a value of a discriminant function of a specific category for a feature vector of an unknown pattern of a specific font; and
    a recognition device recognizing the unknown pattern based on the value of the discriminant function and outputting a recognition; and
    wherein said calculation device:
    calculating a set of difference vectors by calculating a difference between a feature vector of each character pattern in a character pattern set of the specific font and an average feature vector of each correct category;
    calculating an expected value of a probability density function of a specific category using an error distribution corresponding to the set of difference vectors as the probability density function; and
    calculating the value of the discriminant function for the specific category based on the expected value.

4. A pattern recognition apparatus for recognizing a character based on a value of a probability density function defined for each category in a feature vector space of a character pattern, comprising:
    a calculation device calculating a value of a discriminant function of a specific category for a feature vector of an unknown pattern inputted by specific input equipment; and
    a recognition device recognizing the unknown pattern based on the value of the discriminant function and outputting a recognition; and
    wherein said calculation device:
    calculating a set of difference vectors by calculating a difference between a feature vector of each character pattern in a character pattern set, which is inputted by the specific input equipment, and an average feature vector of each correct category;
    calculating an expected value of a probability density function of a specific category using an error distribution corresponding to the set of difference vectors as the probability density function; and
    calculating the value of the discriminant function for the specific category based on the expected value.

5. A pattern recognition apparatus for recognizing a character based on a value of a probability density function defined for each category in a feature vector space of a character pattern, comprising:
    a calculation device calculating a value of a discriminant function of a specific category for a feature vector of an unknown pattern inputted with specific resolution; and
    a recognition device recognizing the unknown pattern based on the value of the discriminant function and outputting a recognition result; and
    wherein said calculation device:
    calculating a set of difference vectors by calculating a difference between a feature vector of each character pattern in a character pattern set, which is inputted with the specific resolution, and an average feature vector of each correct category;
    calculating an expected value of a probability density function of a specific category using an error distribution corresponding to the set of difference vectors as the probability density function; and
    calculating the value of the discriminant function for the specific category based on the expected value.

6. A pattern recognition apparatus for recognizing a character based on a value of a probability density function defined for each category in a feature vector space of a character pattern, comprising:
    a calculation device calculating a value of a discriminant function of a specific category for a feature vector of an unknown pattern when a set $D_{SF}$ of difference vectors is generated by calculating a difference between a feature vector of each character pattern in a character pattern set of a specific font F and an average feature vector of each correct category, a set $D_{SI}$ of difference vectors is generated by calculating a difference between a feature vector of each character pattern in a character pattern set, which is inputted by specific input equipment I, and an average feature vector of each correct category, a set $D_{SR}$ of difference vectors is generated by calculating a difference between a feature vector of each character pattern in a character pattern set, which is inputted with specific resolution R, and an average feature vector of each correct category, an expected value $f_1$ of a probability density function $f_0$ of the specific category is defined at each point in the feature vector space using a normal distribution function with a autocorrelation matrix of the set $D_{SF}$ as a covariance matrix, as a probability density function, an expected value $f_2$ of the expected value $f_1$ is defined at each point using a normal distribution with a autocorrelation matrix of the set $D_{SI}$ as a covariance matrix, as a probability density function, an expected value $f_3$ of the expected value $f_2$ is defined at each point using a normal distribution with an autocorrelation matrix of the set $D_{SR}$ as a covariance matrix, as a probability density function, and the discriminant function is defined based on the expected value $f_3$; and a recognition device recognizing the unknown pattern based on the value of the discriminant function and outputting a recognition result.

7. A pattern recognition apparatus for recognizing a character based on a value of a probability density function defined for each category in a feature vector space of a character pattern, comprising:

a calculation device calculating a value of a discriminant function of a specific category for a feature vector of a target character pattern included in an input document; and a recognition device recognizing the unknown pattern based on the value of the discriminant function and outputting a recognition result; and wherein said calculation device:

calculating a set of difference vectors by calculating a difference between a feature vector of each character pattern in a character pattern set, which are included in the input document and for which a maximum value of a probability density function of a category is larger than a threshold value, and an average feature vector of each correct category;

calculating an expected value of a probability density function of a specific category using an error distribution corresponding to the set of difference vectors as the probability density function; and calculating the value of the discriminant function for the specific category based on the expected value.

8. A computer-readable storage medium which records a program for enabling a computer to recognize a pattern based on a value of a probability density function that is defined for each category in a feature vector space of a pattern, the program enabling the computer to perform:

calculating a set of difference vectors by calculating a difference between a feature vector of each pattern in a specific pattern set and an average feature vector of each correct category;

calculating an expected value of a probability density function of a specific category using an error distribution corresponding to the set of difference vectors as the probability density function; and calculating the value of the discriminant function for the specific category based on the expected value;

recognizing the unknown pattern based on the value of the discriminant function; and outputting a recognition result.

9. A pattern recognition method for recognizing a pattern based on a value of a probability density function defined for each category in a feature vector space of a pattern, comprising:

calculating a set of difference vectors by calculating a difference between a feature vector of each pattern in a specific pattern set and an average feature vector of each correct category;

calculating an expected value of a probability density function of a specific category using an error distribution corresponding to the set of difference vectors as the probability density function; and calculating the value of the discriminant function for the specific category based on the expected value;

recognizing the unknown pattern based on the value of the discriminant function; and outputting a recognition result.

10. A pattern recognition apparatus for recognizing a pattern based on a value of a probability density function defined for each category in a feature vector space of a pattern, comprising:

calculation means for calculating a value of a discriminant function of a specific category for a feature vector of an unknown pattern; and recognition means for recognizing the unknown pattern based on the value of the discriminant function and outputting a recognition result; and wherein said calculation means:

calculating a set of difference vectors by calculating a difference between a feature vector of each pattern in a specific pattern set and an average feature vector of each correct category;

calculating an expected value of a probability density function of a specific category using an error distribution corresponding to the set of difference vectors as the probability density function; and calculating the value of the discriminant function for the specific category based on the expected value.

* * * * *

UNITED STATES PATENT AND TRADEMARK OFFICE
CERTIFICATE OF CORRECTION

| | |
|---|---|
| PATENT NO. | : 7,003,164 B2 |
| APPLICATION NO. | : 09/928361 |
| DATED | : February 21, 2006 |
| INVENTOR(S) | : Hiroaki Takebe |

It is certified that error appears in the above-identified patent and that said Letters Patent is hereby corrected as shown below:

On the cover page, (56) References Cited, Other Publications, column 2, line 11, after "Kanji" insert --"--

Column 11, line 42, after "comprising" insert --:--

Column 11, line 44, change "eigenvecters" to --eigenvectors--

Column 11, line 60, change "recognition;" to --recognition result--

Column 12, line 15, change "recognition" to --recognition result--

Signed and Sealed this

Fifth Day of December, 2006

JON W. DUDAS
*Director of the United States Patent and Trademark Office*